United States Patent
Hamaoka et al.

(10) Patent No.: US 6,498,479 B1
(45) Date of Patent: Dec. 24, 2002

(54) ROTATIONAL ANGLE DETECTOR USING LINEAR CONVERTER

(75) Inventors: Takashi Hamaoka, Kariya (JP); Takamitsu Kubota, Kariya (JP)

(73) Assignee: Denso Corporation, Kariya (JP)

( * ) Notice: Subject to any disclaimer, the term of this patent is extended or adjusted under 35 U.S.C. 154(b) by 87 days.

(21) Appl. No.: 09/666,562

(22) Filed: Sep. 21, 2000

(30) Foreign Application Priority Data

Oct. 27, 1999 (JP) .......................................... 11-304826

(51) Int. Cl.⁷ .......................... G01B 7/30; G01R 33/07; G01P 3/487
(52) U.S. Cl. ................ 324/207.2; 324/174; 324/207.25
(58) Field of Search ........................ 324/207.2, 207.12, 324/207.21, 207.23–207.25, 166, 173–174

(56) References Cited

U.S. PATENT DOCUMENTS

| | | | | |
|---|---|---|---|---|
| 3,867,647 A | * | 2/1975 | Callahan et al. | 307/233 A |
| 4,550,597 A | * | 11/1985 | Drutchas et al. | 73/118 |
| 5,239,490 A | | 8/1993 | Masaki et al. | 364/565 |
| 5,252,919 A | | 10/1993 | Uemura | 324/207.25 |
| 5,264,783 A | * | 11/1993 | Vig et al. | 323/294 |

FOREIGN PATENT DOCUMENTS

| | | |
|---|---|---|
| JP | 5-157506 | 6/1993 |
| JP | 07-167698 | 7/1995 |
| JP | 08-122011 | 5/1996 |
| WO | WO 96/41120 | 12/1996 |

* cited by examiner

Primary Examiner—Edward Lefkowitz
Assistant Examiner—Reena Aurora
(74) Attorney, Agent, or Firm—Nixon & Vanderhye P.C.

(57) ABSTRACT

The rotational angle of a rotatable object (such as the throttle valve of an automobile engine) is accurately detected by a rotational angle detector having a magnetic sensor placed in a magnetic field, the direction of which varies according to the rotational angle. The magnetic sensor generates an output that varies sinusoidally according to rotational angle. The sinusoidal output is converted into a signal that is proportional to the rotational angle under arc-sine or arc-cosine transformation. The converted signal correctly represents the rotational angle in a wide angle range. The sensor element and the circuit for converting the sensor output into the proportional output signal may be built in a single-chip integrated circuit to simplify detector structure.

9 Claims, 7 Drawing Sheets

ROTATIONAL ANGLE DETECTOR USING LINEAR CONVERTER

CROSS-REFERENCE TO RELATED APPLICATION

This application is based upon and claims benefit of priority of Japanese Patent Application No. Hei-11-304826 filed on Oct. 27, 1999, the content of which is incorporated herein by reference.

BACKGROUND OF THE INVENTION

1. Field of the Invention

The present invention relates to a detector for detecting the rotational angle of a rotatable object, the detector using a magnetic sensor element.

2. Description of Related Art

An example of rotational detectors of this kind is disclosed in JP-A-5-157506. The essence of the disclosed detector is illustrated in FIGS. 7A and 7B of accompanying drawings. A Hall element 12 is placed in a parallel magnetic field generated by a cylindrical permanent magnet 11, as shown in FIG. 7A. The cylindrical magnet 11 connected to a rotatable object rotates together with the rotatable object, while the Hall element 12 stays in the magnetic field. An angle θ made between an magnetosensitive surface of the Hall element 12 and the magnetic field direction changes according to rotation of the rotatable object, as shown in FIG. 7B. The Hall element 12 generates the following output voltage VH:

$$VH = V_0 \cdot \sin \theta,$$

where $V_0$ is a maximum value of VH that is generated when the angle θ is 90° The output VH is fed to an outside microcomputer that calculates the rotational angle of the rotatable object based on VH.

The output VH, however, is a sinusoidal curve that is not perfectly proportional to the angle θ, though it is substantially proportional in a limited narrow range. In other words, the angle θ is not correctly detected in a range beyond the limited narrow range. It may be possible to process the output VH in the computer to convert it into a correct rotational angle, but such conversion process makes the computer more complex.

SUMMARY OF THE INVENTION

The present invention has been made in view of the above-mentioned problem, and an object of the present invention is to provide an improved rotational angle detector that correctly detects the rotational angle in a wide range without making the detector complex.

The rotational angle detector is composed of a rotor, a magnetic sensor element and circuits for processing the sensor signal. The rotor is connected to a rotatable object such as a throttle valve, the rotational angle of which is to be detected. Magnets are mounted on the rotor to generate a magnetic field therein, and a magnetic sensor element such as a Hall element is disposed in the magnetic field. The magnetic sensor element generates an output in a form of a sine or cosine wave according to the rotational angle of the rotor. The sensor output is not exactly proportional to the rotational angle because it varies in a sinusoidal waveform. A linear converter provided in the circuits converts the sensor output to a signal which is proportional, or linear, to the rotational angle of the rotor. This conversion is preferably performed under arc-sine or arc-cosine transformation. The converted sensor signal represents a correct rotational angle in a wide angle range.

The magnetic sensor element may be rotated relative to the magnetic field while making the magnetic field stationary. The linear converter and the magnetic sensor element may be built in a single-chip-integrated circuit to simplify the detector structure, or they may be separately build in respective integrated circuits if such is convenient for structuring the detector.

Preferably, the analog sensor output is converted into a digital signal, and then the digital signal is converted into the signal linear to the rotational angle under the arc-sine or arc-cosine transformation. The rotational angle detector may include two output terminals, one for an analog signal and the other for a digital signal, so that the output is adaptable to both of analog and digital outside controllers.

The rotational angle detector according to the present invention is able to correctly detect the rotational angle over a wide range without making the detector structure complex.

Other objects and features of the present invention will become more readily apparent from a better understanding of the preferred embodiments described below with reference to the following drawings.

DETAILED DESCRIPTION OF THE PREFERRED EMBODIMENTS

Figure 1:
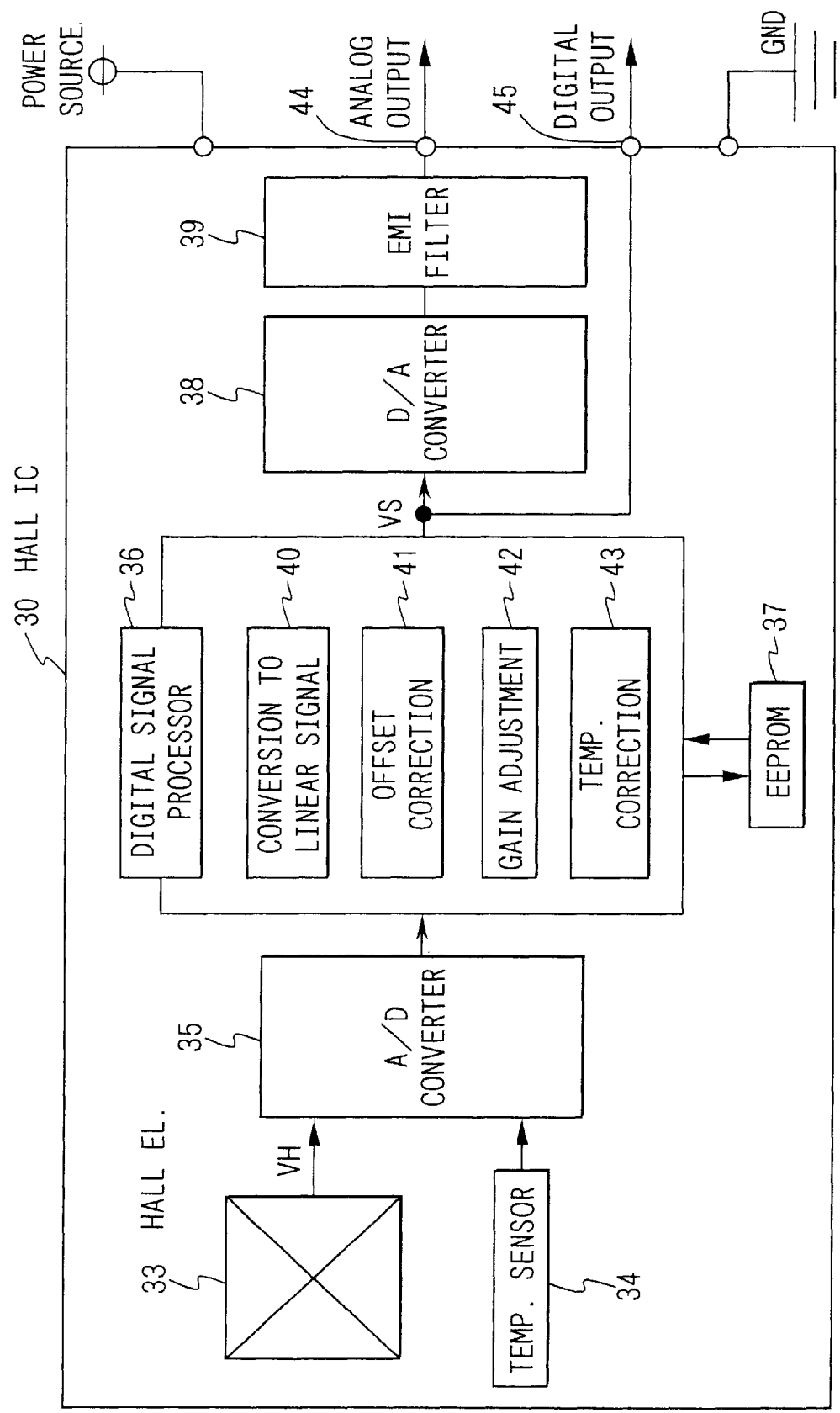
FIG. 1 is a block diagram showing an entire circuit in a Hall IC mounted in a rotational angle detector of the present invention.

A first embodiment of the present invention will be described with reference to FIGS. 1 to 5. First, referring to FIG. 2, the structure of a rotational angle detector will be described. The rotational angle detector includes a rotor housing 21 in which a rotor is rotatably housed and a cover housing 28 to which Hall ICs 30 are held. The rotor housing 21 is cylinder-shaped, its one side (left side) being closed and the other side being open. The open side is closed with the cover housing 28.

A rotor shaft 22 connected to a rotatable object such as a throttle valve of an automotive engine, the rotational speed of which is to be detected, is rotatably supported by a bearing 23 held in the rotor housing 21. A cup-shaped rotor core 24 is fixed to the end of the rotor shaft 22. A pair of permanent magnets 25 are fixed to the inner bore of the cup-shaped rotor core 24 by adhesive, molding or the like. The magnets 25 are magnetized to form a parallel magnetic field in the direction perpendicular to the longitudinal direction of the rotor shaft 22. Plural through-holes 26 for preventing the magnetic flux from being short-circuited are formed in a flat end portion of the magnetic core 24 to encircle the rotor shaft 22. The outside of the rotor core 24 is molded with resin 27.

The cover housing 28 made of resin is fixed to the rotor housing 21 to close its open side. A boss 29 of the cover housing 28 extends into the inner space between the pair of magnets 25. A pair of Hall ICs 30 are held in the boss 29. The pair of Hall ICs 30 are overlapped on each other, so that outputs from both Hall ICs 30 are compared with each other to check whether they are properly functioning. Terminals 31 of both Hall ICs 30 are connected to a connector pin 32 inserted in the cover housing 28. The pair of Hall ICs 30 may be placed side by side instead of overlapping, or only one Hall IC 30 may be used instead of two.

Figure 2:
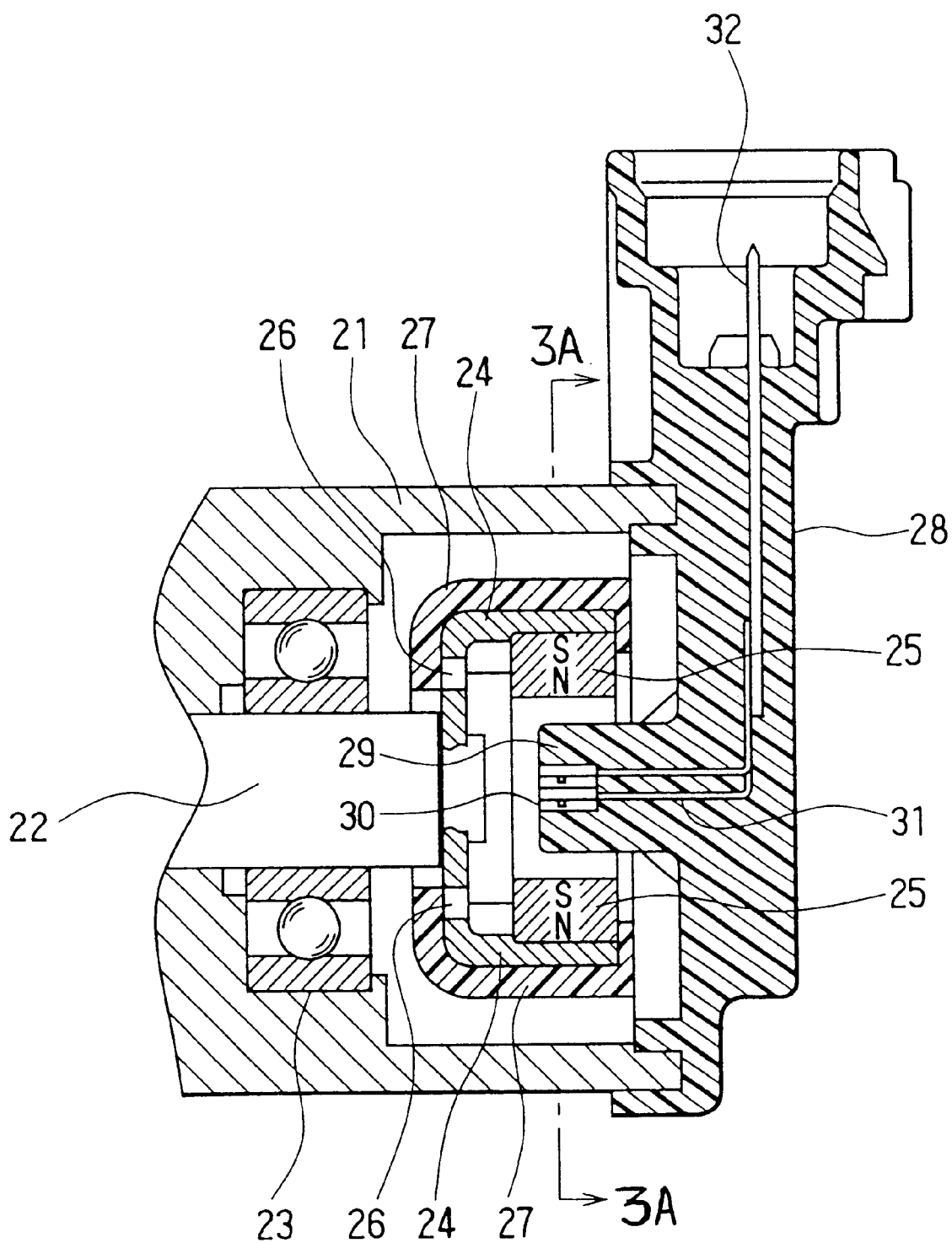
FIG. 2 is a cross-sectional view showing a rotational angle detector as a first embodiment of the present invention.
Figure 3A:
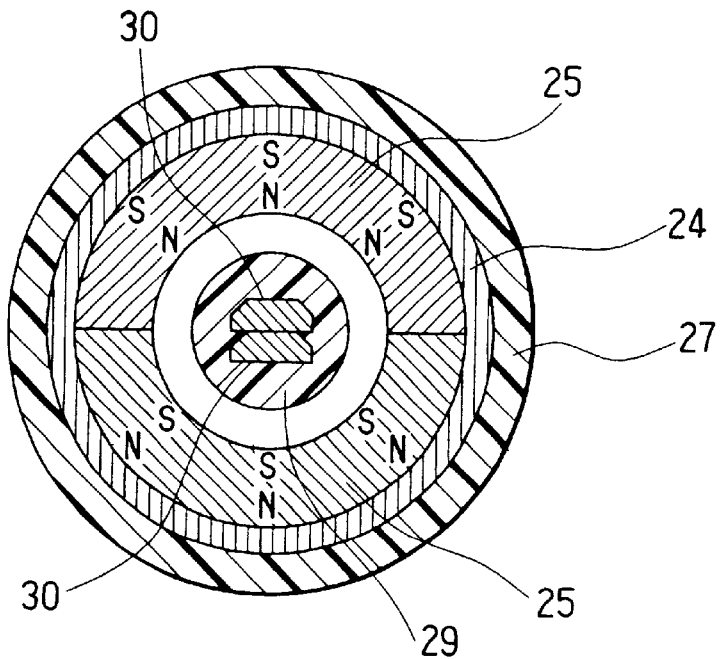
FIG. 3A is a cross-sectional view showing a structure of permanent magnets used in the rotational angle detector shown in FIG. 2, taken along line 3A—3A in FIG. 2.
Figure 3B:
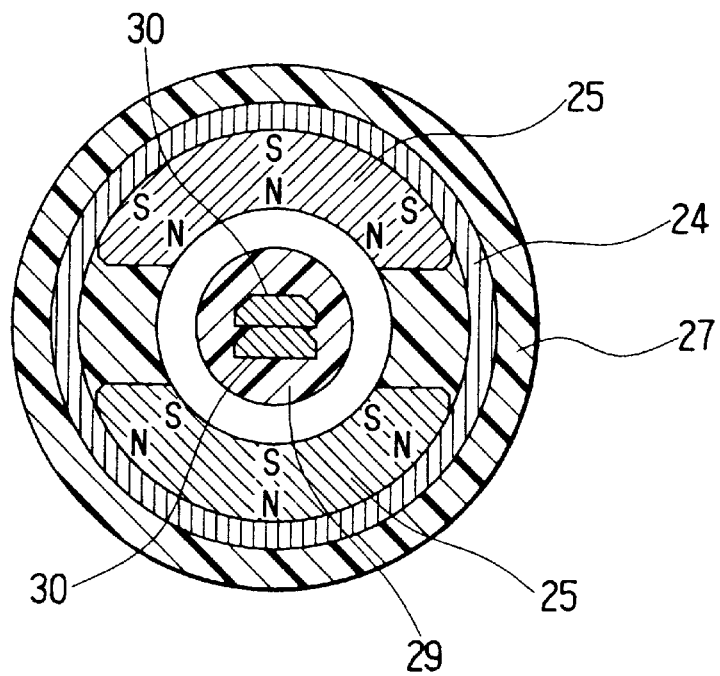
FIG. 3B is a cross-sectional view showing an alternative structure of the permanent magnets shown in FIG. 3A.

Referring to FIGS. 3A and 3B, taken along line 3A—3A of FIG. 2, the arrangement of the pair of permanent magnets 25 and the pair of Hall ICs 30 will be described. In FIG. 3A, a pair of half-circular permanent magnets 25 are abutted with each other and magnetized as illustrated to form a parallel magnetic field running vertically in the drawing. The pair of Hall ICs 30 are positioned in the center of the parallel magnetic field. Alternatively, the permanent magnets 30 may be arranged as illustrated in FIG. 3B. A pair of arc-shaped magnets 25 are disposed with a certain space therebetween. The Hall ICs 30 are similarly positioned in the center of the parallel magnetic field. Other arrangements of the magnets are also possible, as long as a parallel magnetic field is formed in the inner space of the rotor where the Hall ICs 30 are positioned.

Referring to FIG. 1, the structure and function of the Hall IC 30 will be described. The Hall IC 30 is a one-chip IC which includes: a Hall element 33 as a magnetic sensor element; a temperature sensor element 34; an A/D converter 35; a digital signal processor 36; an EEPROM 37; a D/A converter 38; and an EMI filter 39. The Hall element 33 generates its output voltage according to the magnetic field direction. The temperature sensor element 34 outputs a signal according to a temperature of the Hall IC 30. The A/D converter 35 converts analog signals fed from the Hall element 33 and the temperature sensor element 34 into digital signals. The converted digital signals are fed to the digital signal processor 36.

The digital signal processor (DSP) 36 performs the following functions: a function 40 for converting the output voltage VH of the Hall element 33 into a signal VS proportional to the rotational angle θ (the portion of the DSP performing this function 40 will be referred to as a linear converter); a function 41 for correcting an offset; a function 42 for adjusting a gain; and a function 43 for correcting the output according to the temperature.

Figure 4A:
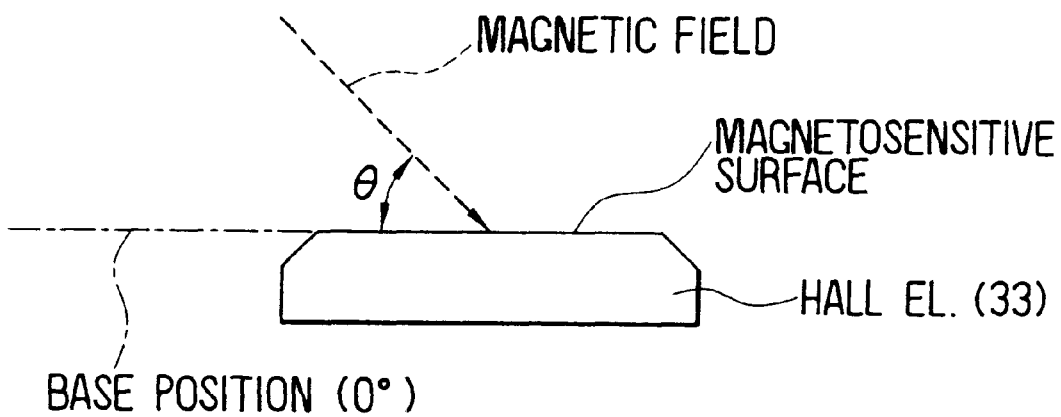
FIGS. 4A and 4B are drawings illustrating a rotational angle θ relative to a magnetosensitive surface of a Hall IC.

More particularly, the linear converter converts the sensor output VH (after it is converted to a digital signal through the A/D converter 35) into the signal VS that is proportional to the rotational angle θ under arc-sine or arc-cosine transformation. When the rotational angle θ is measured from a base position set on the magnetosensitive surface of the Hall element 33, as shown in FIG. 4A, the output VH of the Hall element 33 is expressed as follows:

VH=$V_0$. sin θ, where $V_0$ is the maximum output obtained at a position, θ=90°. The rotational angle θ is calculated under the arc-sine transformation according to the following formula:

$$\theta = \arcsin(VH/V_0)$$

Figure 5:
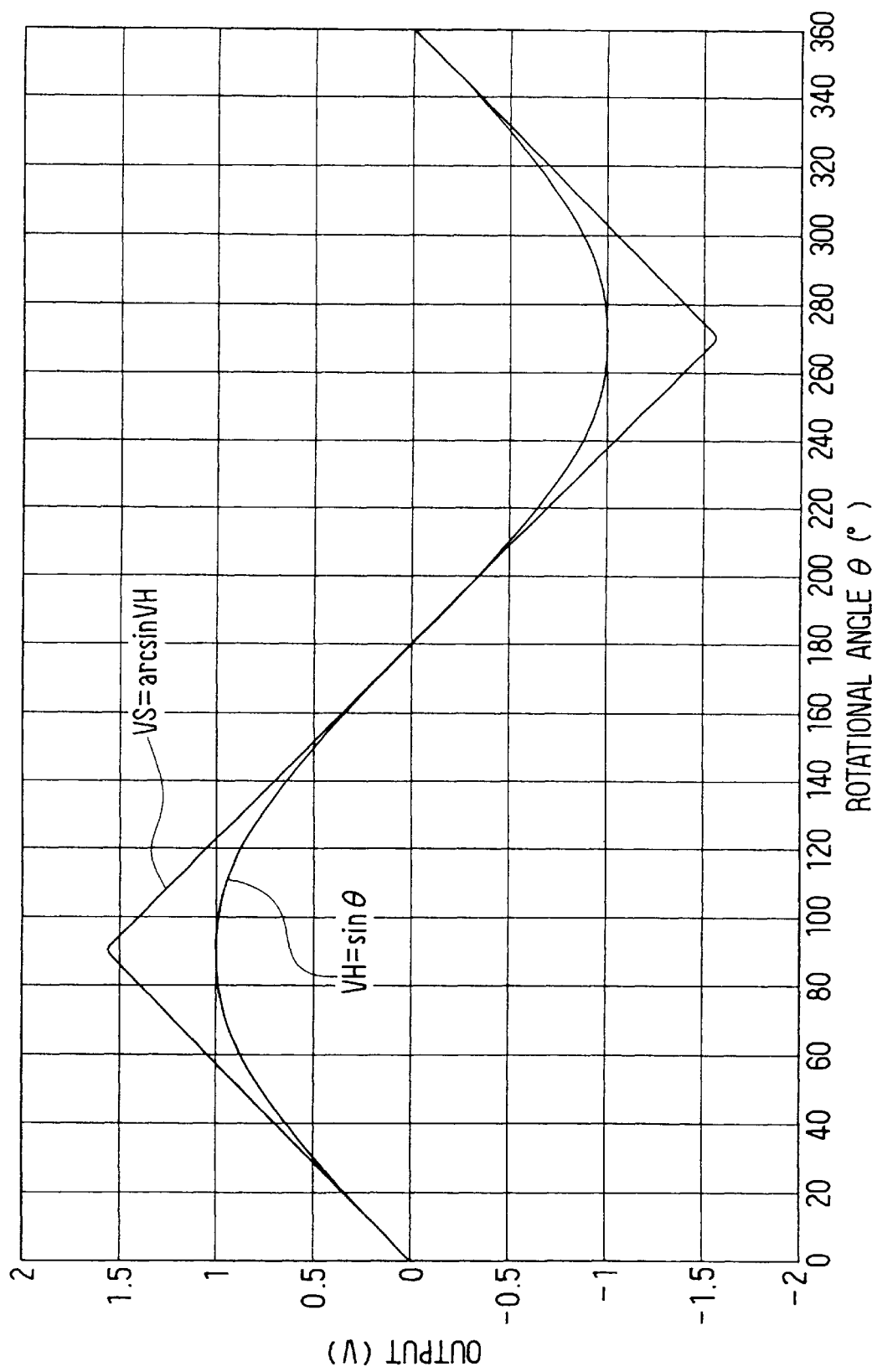
FIG. 5 is a graph showing an output VH of a Hall element and a converted output VS versus the rotational angle θ.

The linear converter outputs the signal VS expressed in the following formula:

$$VS = G. \arcsin(VH/V_0)$$

where G is a gain of the conversion. The signal VH of the Hall element 33 and the converted signal VS are shown in the graph of FIG. 5. This graph shows the output voltage versus the rotational angle θ, where $V_0$=1 volt and G=1. Accordingly, in this graph, VH and VS are expressed as: VH=sin θ; and VS=arcsin VH. As seen in this graph, the output VH of the Hall element 33 is converted into the signal VS which is proportional, or linear, to the rotational angle θ under the arc-sine transformation.

Figure 4B:
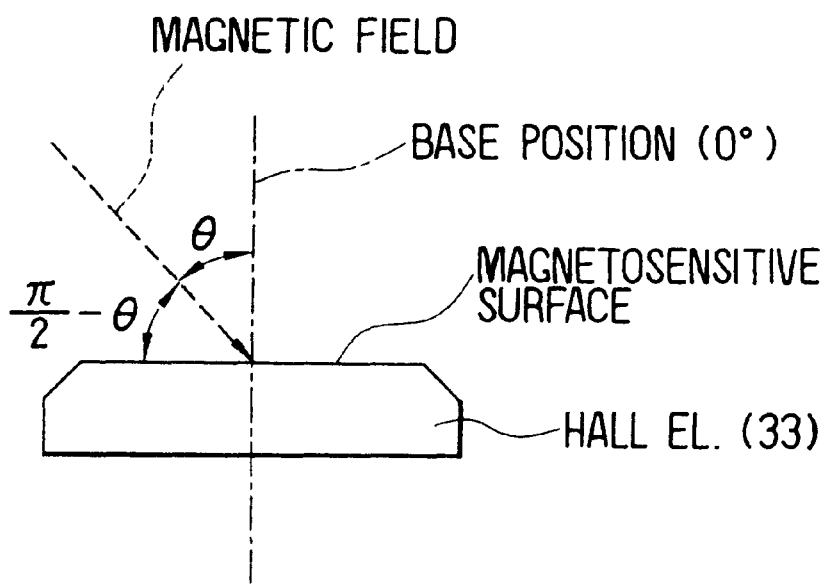

Similarly, when the rotational angle θ is measured from a base position set at a line perpendicular to the magnetosensitive surface of the Hall element 33, as shown in FIG. 4B, the output VH of the Hall element 33 is expressed as follows:

$$VH = V_0. \sin(\pi/2 - \theta) = V_0. \cos\theta$$

The rotational angle θ is calculated under the arc-cosine transformation according to the following formula:

$$\theta = \arccos(VH/V_0)$$

The linear converter outputs the signal VS expressed in the following formula:

$$VS = G. \arccos(VH/V_0)$$

The signal VS that is proportional to the rotational angle θ may be calculated in other manners than the above. For example, a map showing the relation between VH and VS is stored in the processor, and the VS is calculated based on the map.

An offset angle of the rotational angle, e.g., a deviation of a (θ=0) position from the magnetosensitive surface of the Hall element 33, is corrected by the offset correction function 41 in the DPS 36. The gain G in the process of converting VH to VS is adjusted by the gain adjustment function 42. An output deviation of the Hall element 33 due to temperature changes is corrected by the temperature correction function 43 based on the temperature signal fed from the temperature sensor 34. A program performing those functions 40–43 in the DSP 36 is stored in the EEPROM 37, and the program can be modified from outside by electrical trimming. Some other functions than the functions 40–43 may be added in the DSP 36, or one or more functions may be eliminated from among the functions 41–43. If the temperature correction function 43 is eliminated, the temperature sensor 34 is also eliminated. Alternatively, the temperature sensor 34 may be disposed separately from the one-chip Hall IC 30.

As shown in FIG. 1, the output digital signal VS from the DSP 36 is converted into an analog signal by the D/A converter 38 and then fed to the EMI filter 39 that eliminates electromagnetic interference. The analog signal is output from an analog signal terminal 44. On the other hand, the digital signal VS is directly output from a digital signal terminal 45. If a control circuit connected to the Hall IC 30 is an analog circuit, the analog signal VS is used. If the control circuit is digital, the digital signal VS is used. In other words, the Hall IC 30 is adaptable to both analog and digital control circuits. It is, of course, possible to provide only one signal VS as either an analog or digital signal.

Though all the components 33–39 are built in a single-chip Hall IC 30 in the particular embodiment shown in FIG. 1 to simplify the circuit, the Hall element 33 may be separated from the Hall IC 30. A conventional rotational angle detector having only the Hall element outputting the signal VS may be modified by adding a circuit including the digital signal processor 36 and other necessary components.

A second embodiment of the present invention will be described with reference to FIG. 6, in which the components or parts performing the same function as in the first embodiment carry the same reference numbers. A rotatable lever 51 connected to a rotatable object is formed by molding the rotor core 24 and the permanent magnets 25 together with molding resin 50. A resin housing 61 includes a boss 52 in which one or two Hall ICs 30 are inserted and a connector terminal housing 56 in which a connector pin 58 is housed. The inner bore of the rotatable lever 51, formed by the molding resin 50, is rotatably supported by the boss 52. A stopper plate 53 is fixed to the end portion of the boss 52 to prevent the rotatable lever 51 from sliding off from the boss 52. A spring washer 54 is interposed between the stopper plate 53 and the rotatable lever 51 to adjust an axial movement of the rotatable lever 51. The rotatable lever 51 is biased to its initial position by a twisted coil spring 55. The rotatable lever 51 is rotated by the rotatable object connected thereto against the biasing force of the twisted coil spring 55.

The Hall IC 30 (one or two) inserted in the boss 52 is placed in the parallel magnetic field generated by the permanent magnets 25. A circuit board 57 is held by the projection 62 formed in the housing 61 and electrically connected to a connector pin 58 housed in the connector housing 56. The Hall IC terminal 31 is electrically connected to the circuit board 57. An opening at the right side of the housing 61 is closed with a cover 60 with a seal member 59 interposed therebetween. The second embodiment described above operates in the same manner as the first embodiment.

Figure 6:
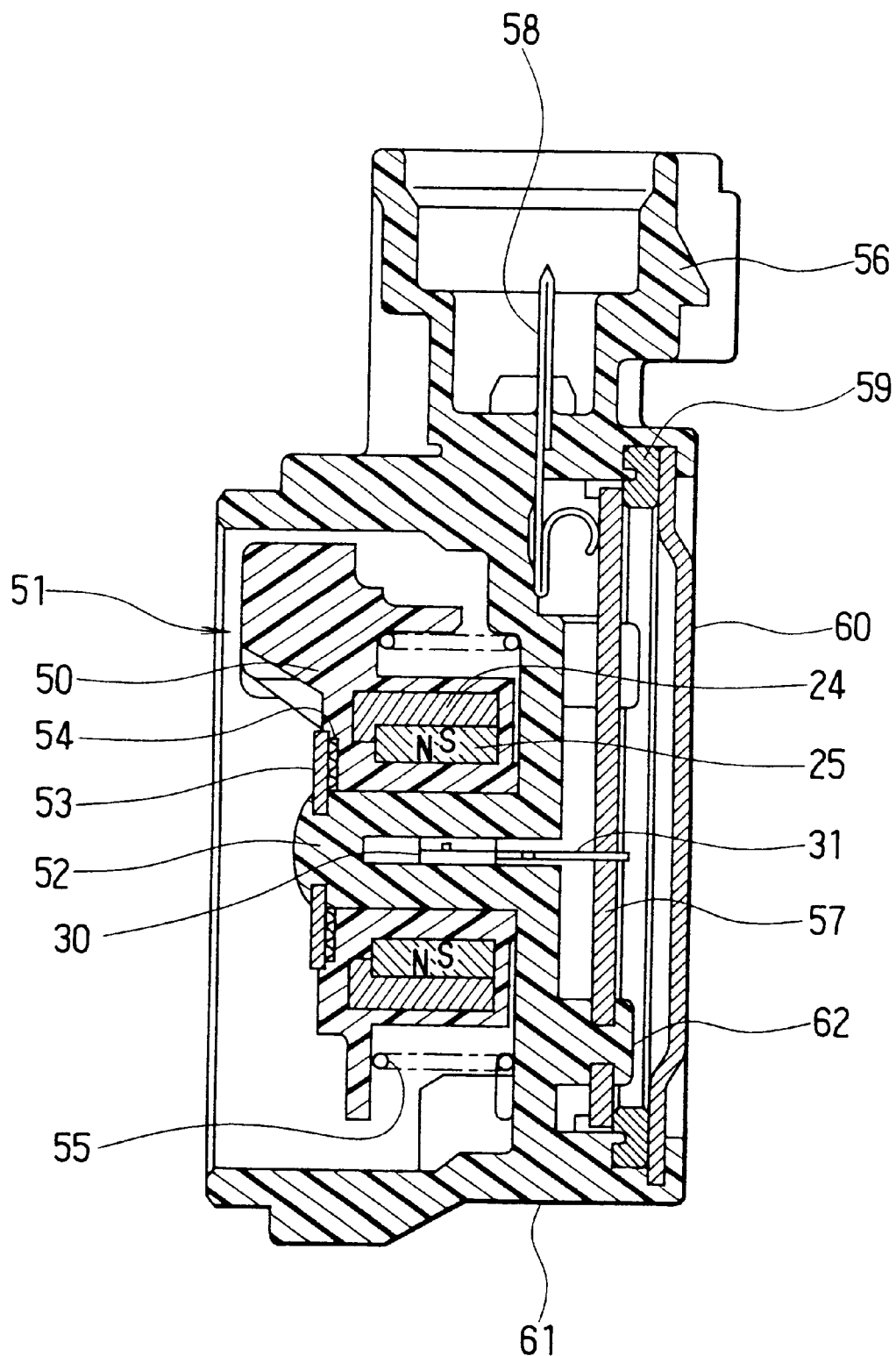
FIG. 6 is a cross-sectional view showing a rotational angle detector as a second embodiment of the present invention.
Figure 7A:
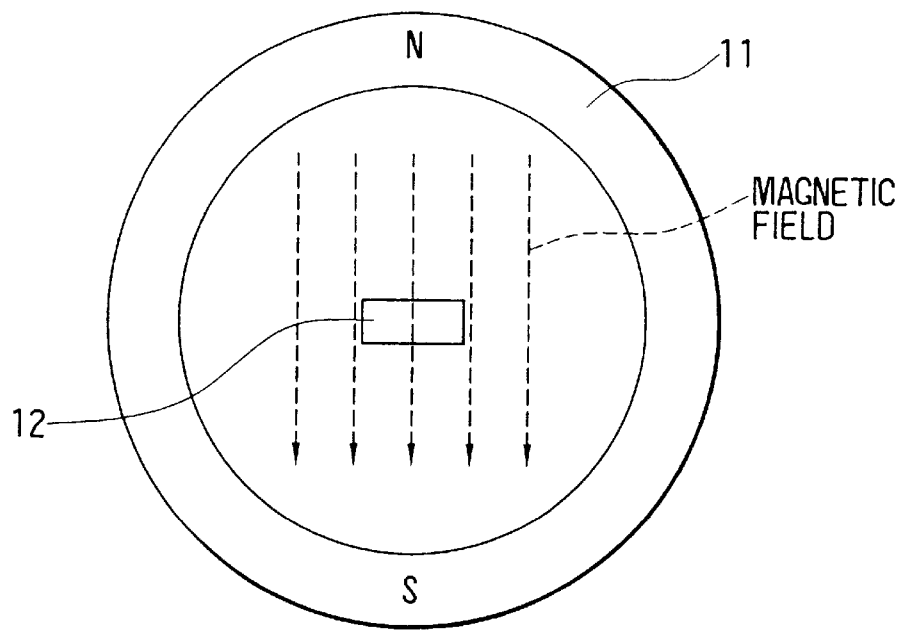
FIGS. 7A and 7B are drawings illustrating operation of a Hall element in a conventional rotational angle detector.
Figure 7B:
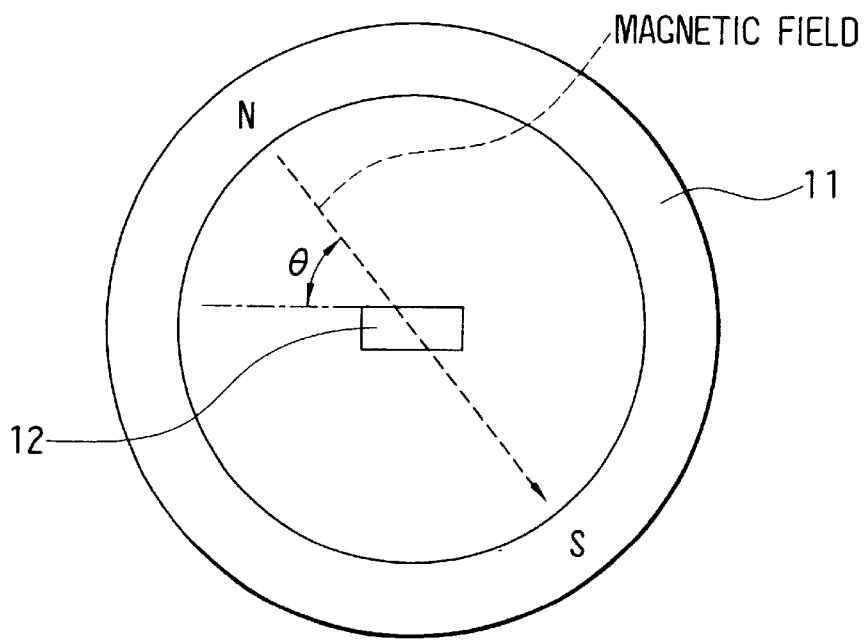

The Hall IC 30 shown in FIG. 1 is inserted in the boss 52 in the embodiment shown in FIG. 6. However, the temperature sensor 34, the digital signal processor 36 and other circuit components other than the Hall element 33 may be separated from the Hall IC 30, and they may be mounted on the circuit board 57.

Other circuits, such as an amplifier for amplifying the output of the Hall element 33, may also be included in the Hall IC 30 shown in FIG. 1. A magnetoresistance element may be used as a magnetic sensor in place of the Hall element 33. Though the rotor having permanent magnets are rotated relative to the Hall element 33 in both embodiments described above, it is also possible to rotate the Hall element 33 in the stationary magnetic field.

While the present invention has been shown and described with reference to the foregoing preferred embodiments, it will be apparent to those skilled in the art that changes in form and detail may be made therein without departing from the scope of the invention as defined in the appended claims.

What is claimed is:

1. A rotational angle detector for a rotatable object comprising:
   a substantially parallel magnetic field generated by a magnet;
   a magnetic sensor element disposed in the substantially parallel magnetic field;
   means for causing relative rotation between the magnetic field and the magnetic sensor element;
   an analog to digital converter for converting an analog output of the magnetic sensor element to a digital signal;
   means for converting the digital signal to a signal linear to a rotational angle of the rotatable object wherein the conversion to the linear signal is performed under arc-sine or arc-cosine transformation;
   means for outputting the linear signal as a digital signal; and
   means for outputting the linear signal as an analog signal.

2. A rotational angle detector as in claim 1, wherein:
   the magnetic sensor element and the means for converting the digital signal to a signal linear to a rotational angle are built in a single-chip integrated circuit.

3. A rotational angle detector as in claim 1, wherein:
   the magnetic sensor element and the means for converting the digital signal to a signal linear to a rotational angle are separately built in respective integrated circuits.

4. A rotational angle detector as in claim 1, wherein:
   the magnet is connected to the rotatable object so that the magnet rotates together with the rotatable object, while the magnetic sensor element is stationary.

5. A rotational angle detector as in claim 1, wherein:
   the linear signal is outputted as a mapped value relative to the analog output.

6. A rotational angle detector as in claim 1, wherein:
   the magnet is contained in a cup-shaped rotor core and an opening of the cup-shaped rotor core is covered with a cover housing having a center boss extending into an inside space of the cup-shaped rotor core;
   the magnetic sensor element is held in the center boss; and
   the magnetic sensor element and a connector pin electrically connected to the magnetic sensor element are integrally molded with resin in the cover housing.

7. A rotational angle detector as in claim 6, wherein:
   the rotor core and the magnet are integrally molded with resin forming a rotating body;
   the rotating body includes a center bore rotatably coupled with the center boss of the cover housing; and
   a rotatable lever to be connected to the rotatable object is also integrally formed with the rotating body.

8. A method for detecting a rotational angle, said method comprising:
   causing relative rotation to occur between substantially parallel magnetic field lines and a magnetic sensor to produce an analog signal that varies sinusoidally with respect to rotational angle;
   converting said analog sinusoidally varying signal to a corresponding digital signal;
   digitally processing said digital signal with an arc-sine or arc-cosine transformation to produce a digital first output signal that varies linearly with respect to rotational angle over a range substantially greater than 90 degrees; and
   converting said digital first signal to an analog second output signal that also varies linearly with respect to rotational angle over a range substantially greater than 90 degrees.

9. A method as in claim 8 wherein said digitally processing includes generation of a lookup table value mapping sinusoidally varying input to a linearly varying output.

* * * * *

UNITED STATES PATENT AND TRADEMARK OFFICE
CERTIFICATE OF CORRECTION

PATENT NO. : 6,498,479 B1
DATED : December 24, 2002
INVENTOR(S) : Hamaoka et al.

It is certified that error appears in the above-identified patent and that said Letters Patent is hereby corrected as shown below:

<u>Title page,</u>
Item [56], References Cited, add:

FOREIGN PATENT DOCUMENTS

-- U-58-47710  1983  Japan --

Signed and Sealed this

Twenty-seventh Day of May, 2003

JAMES E. ROGAN
*Director of the United States Patent and Trademark Office*